US008898417B1

(12) United States Patent
Post et al.

(10) Patent No.: US 8,898,417 B1
(45) Date of Patent: Nov. 25, 2014

(54) BLOCK-BASED STORAGE DEVICE WITH A MEMORY-MAPPED INTERFACE

(75) Inventors: Sam Post, Folsom, CA (US); Jared Hulbert, Shingle Springs, CA (US); Stephen Bowers, Woodland, CA (US); Mark Leinwander, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 12/582,643

(22) Filed: Oct. 20, 2009

(51) Int. Cl.
G06F 12/00 (2006.01)

(52) U.S. Cl.
USPC .............. 711/170; 714/53; 714/798; 711/168

(58) Field of Classification Search
USPC ...................... 711/114, 168, 170; 714/53, 798
See application file for complete search history.

(56) References Cited

U.S. PATENT DOCUMENTS

| 6,356,991 B1* | 3/2002 | Bauman et al. ............... 711/209 |
| 6,535,949 B1* | 3/2003 | Parker ........................... 711/103 |
| 7,418,543 B2* | 8/2008 | Jain et al. ...................... 711/108 |
| 2004/0193755 A1* | 9/2004 | Safranek et al. ................ 710/22 |
| 2006/0174056 A1* | 8/2006 | Lambert et al. ............... 711/103 |
| 2008/0306723 A1* | 12/2008 | De Ambroggi et al. ...... 711/103 |

* cited by examiner

*Primary Examiner* — Kalpit Parikh
(74) *Attorney, Agent, or Firm* — Schwegman Lundberg & Woessner, P.A.

(57) ABSTRACT

Described herein are methods for accessing a block-based storage device having a memory-mapped interface and a block interface. In one embodiment, an apparatus (e.g., block-based storage device) includes a storage array to store data and a memory-mapped interface that is coupled to the storage array. The memory-mapped interface includes memory-mapped memory space. The memory-mapped interface receives direct access requests from a host to directly access memory-mapped files. The apparatus also includes a block interface that is coupled to the storage array. The block interface receives block requests from a storage driver to access the storage array.

18 Claims, 8 Drawing Sheets

BLOCK-BASED STORAGE DEVICE WITH A MEMORY-MAPPED INTERFACE

BACKGROUND

1. Field of the Invention

Embodiments of the present invention relate generally to the field of accessing a block-based storage device with a memory-mapped interface and a block-based interface.

2. Description of the Related Art

Electronic devices may require high speed access to non-volatile memory contained within these devices. Prior approaches access memory either using block access to a block storage device or memory-mapped access to a memory device. A conventional memory-mapped approach includes initiating a system call with a user program to memory-map an open file. If an underlying storage device has a memory-mapped interface, then the OS requests a physical address for address range(s) from the storage driver. The driver implements a direct access method to perform any setup operations to obtain a physical address for the given range. Then, the OS processes and updates page tables which may cause faults to read/write requests to the memory-mapped region. The OS returns a virtual address of the memory-mapped region. The user program is now able to read/write to the memory-mapped region.

If the underlying storage device is not memory-mappable, then the OS optionally caches select pages from the file into RAM and the process proceeds to the process page table operation. After the memory-mapped access setup is complete, a user program can initiate a read/write request to memory. If a requested page is mapped, then a processor resumes execution of the user program and determines if the page is located in RAM. If so, a memory controller completes the request directly to/from RAM and transfers data to the processor. If not, then the memory controller requests data from a memory-mapped capable I/O device and this device transfers data to the processor.

A memory-mapped device is generally simpler for the user application to interface with, and typically results in lower latency per request than a block-based storage device. However, the total bandwidth of a memory-mapped device will generally be lower due to reduced parallelism in comparison to a block device.

BRIEF DESCRIPTION OF THE DRAWINGS

One or more embodiments of the present invention are illustrated by way of example and not limitation in the figures of the accompanying drawings, in which like references indicate similar elements and in which.

Figure 1:
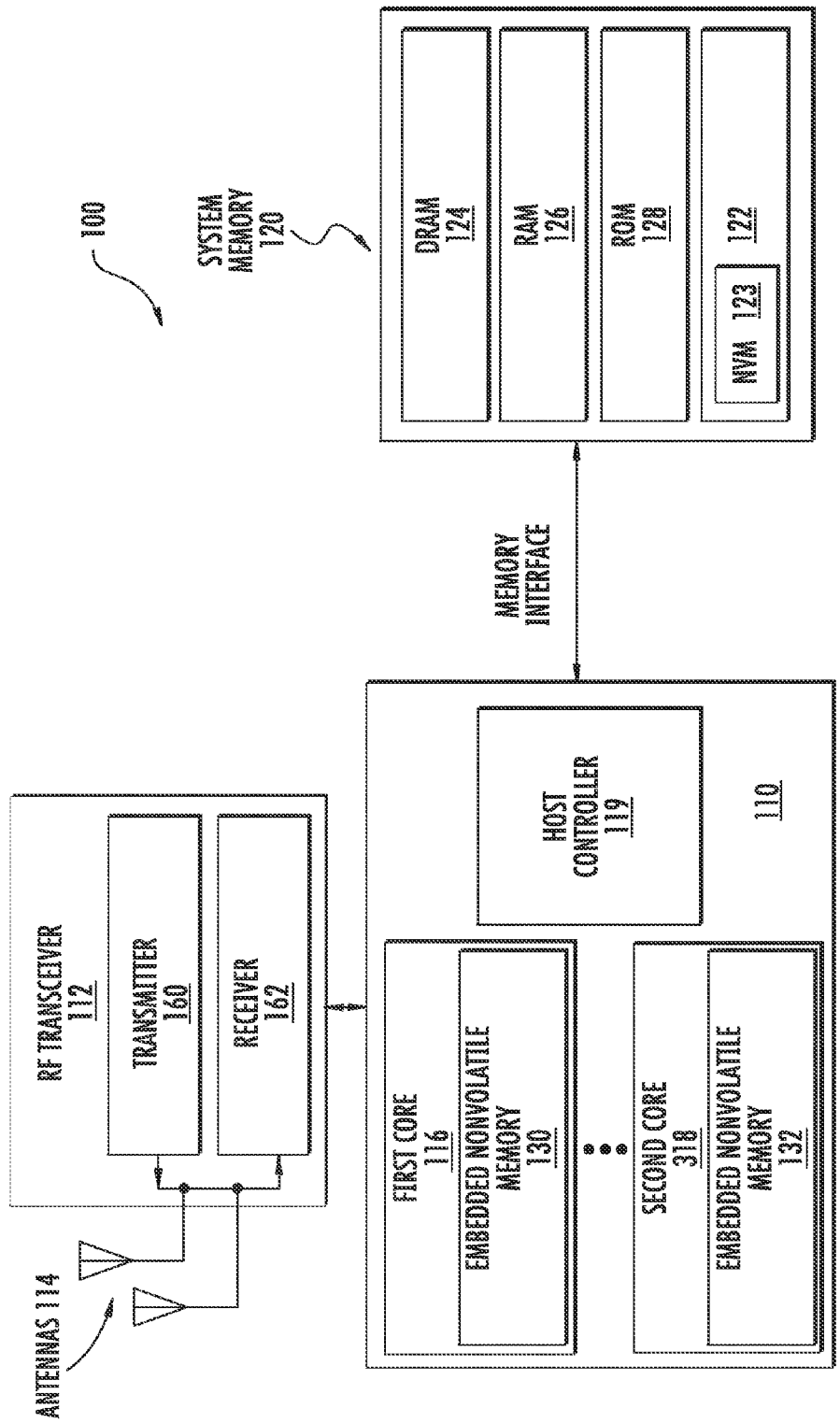
FIG. 1 illustrates a data processing device in accordance with one embodiment.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

Described herein are methods for accessing a block-based storage device having a memory-mapped interface and a block interface. In one embodiment, an apparatus (e.g., block-based storage device) includes a storage array to store data and a memory-mapped interface that is coupled to the storage array. The memory-mapped interface includes memory-mapped memory space, which is used to fulfill read/write requests. The memory-mapped interface receives access requests (e.g., memory store/load requests) from the host processor to directly access memory-mapped files. The apparatus also includes a block interface that is coupled to the storage array. The block interface receives block requests from the storage driver to access the storage array.

In some embodiments, the block-based storage device allows a gradual transition to memory-mapped storage technology. This device can allow existing block accesses for legacy applications while additionally providing memory-mapped storage for newer applications that can take advantage of this feature. A memory-mapped storage device with direct access or memory-mapped access has more efficient performance for smaller amounts of data compared to DMA block transfers. The memory-mapped storage device of the present disclosure is also capable of DMA transfers of data via the block interface, which are more efficient for larger amounts of data compared to memory-mapped transfers. DMA transfers only occur while using the block interface.

The present disclosure provides a mixed hardware/software design that utilizes memory-mapped files. This design provides direct or memory-mapped access to files in a storage array as well as a block interface for unmapped files. Direct-mapped files are directly accessible from user space with no caching or write combining, thus completely bypassing the block subsystem. This design provides ultra-fast "zero-copy" user space access to memory-mapped files. Additionally, the filesystem itself may take advantage of the memory-mapped characteristics of the device to store file allocation tables or other metadata for direct access; this would reduce the RAM caching requirements and provide performance improvement for file and directory listings. Once the setup steps are complete for memory-mapping a file which resides on a direct-mapped device, future read and/or write requests require very little software and operating system interaction to complete.

FIG. 1 illustrates a data processing device with memory-mapped access and block access to non-volatile memory in accordance with one embodiment. The data processing device 100 includes a processing unit 110 having first and second processor cores 116 and 118, a host controller 119, and a system memory 120 coupled to the processing unit 110. The host controller 119 can be internal to the processing unit 110 or external to the processing unit 110. The first and second processing cores 116 and 118 include embedded non-volatile memory 130 and 132, respectively. The system memory 120 includes a circuit device 122, which may be an integrated circuit device 122, and various types of memory (e.g., DRAM 124, RAM 126, ROM 128). The integrated circuit device 122 includes a non-volatile memory array 123 that can be accessed via a block interface or via a memory-mapped interface. This also allows execute in place (XIP), which is a method of executing programs directly from long term storage rather than copying it into RAM. The integrated circuit device 122 will be discussed in more detail in conjunction with FIGS. 2 and 3.

The data processing device 100 may optionally include a transceiver 112 coupled to the processing unit 110. The transceiver 112 receives over-the-air signals with antennas 114 and includes a transmitter 160 and a receiver 162. As shown in this wireless embodiment, data processing device 100 includes one or more antenna structures 114 to allow radios to communicate with other over-the-air data processing devices. As such, data processing device 100 may operate as a cellular device or a device that operates in wireless networks. The radio subsystems collocated in the same platform of device 100 provide the capability of communicating with different frequency bands in an RF/location space with other devices in a network. It should be understood that the scope of the present disclosure is not limited by the types of, the number of, or the frequency of the communication protocols that may be used by data processing device 100.

The embodiment illustrates the coupling of antenna structure 114 to a transceiver 112 to accommodate modulation/demodulation. In general, analog front end transceiver 112 may be a stand-alone Radio Frequency (RF) discrete or integrated analog circuit, or transceiver 112 may be embedded with a processor having one or more processor cores 116 and 118. The multiple cores allow processing workloads to be shared across the cores and handle baseband functions and application functions. An interface may be used to provide communication or information between the processor and the memory storage in a system memory 120. Although the scope of the present invention in some embodiments is not limited in this respect, the interface may comprise serial and/or parallel buses to share information along with control signal lines to be used to provide handshaking between the processor and system memory 120.

The system memory 120 may optionally be used to store instructions that are executed by the processor during the operation of wireless data processing device 100, and may be used to store user data such as the conditions for when a message is to be transmitted by wireless data processing device 100 or the actual data to be transmitted. For example, the instructions stored in system memory 120 may be used to perform wireless communications, provide security functionality for data processing device 300, user functionality such as calendaring, email, internet browsing, etc.

System memory 120 may be provided by one or more different types of memory and may include both optional DRAM, RAM, and/or ROM and the integrated circuit device 122 having non-volatile memory (NVM) 123. The NVM 123 may include a phase change material. NVM 123 may be referred to as a Phase Change Memory (PCM), Phase-Change Random Access Memory (PRAM or PCRAM), Ovonic Unified Memory (OUM) or Chalcogenide Random Access Memory (C-RAM). NVM 123 may include flash memory, solid state drive, and card/stick memory.

System memory 120 may be, for example, any type of solid-state or magnetic memory device. System memory 120 may be or include a machine-readable medium or a computer-readable medium. A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

The volatile and nonvolatile memories may be combined in a stacking process to reduce the footprint on a board, packaged separately, or placed in a multi-chip package with the memory component placed on top of the processor. The embodiment also illustrates that one or more of the processor cores may be embedded with nonvolatile memory 130 and 132.

Figure 2:
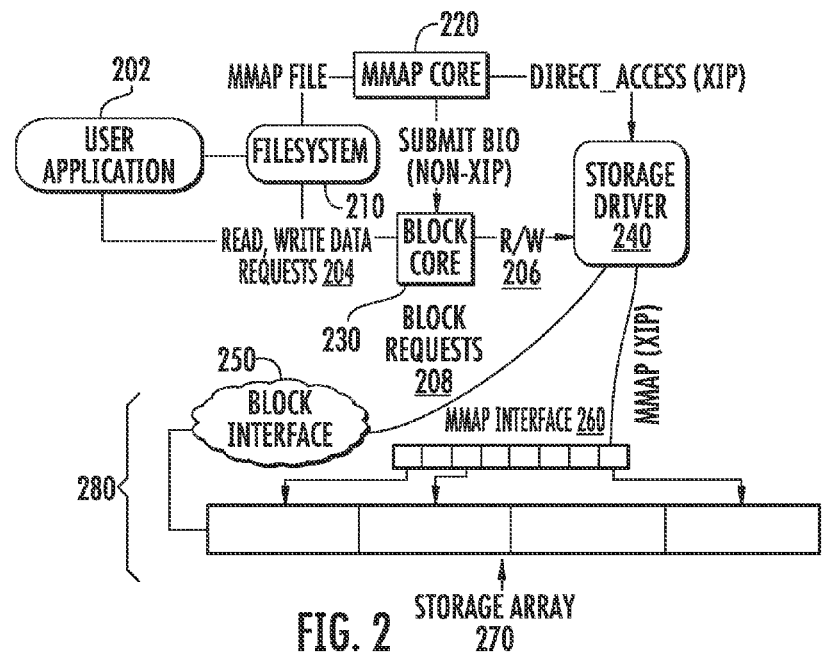
FIG. 2 illustrates a data flow for a filesystem that provides direct or memory-mapped access to files in a storage array in accordance with one embodiment.

FIG. 2 illustrates a data flow for a memory-mapped (MMAP) capable filesystem that provides direct or memory-mapped access to files in a storage array in accordance with one embodiment. MMAP capable filesystems (e.g., XIP capable filesystems) can memory-map a file directly into a user-space process without copying the relevant sections (e.g., pages) into RAM and incurring the overhead of caching/flushing writes operations. A storage device 280 has a block interface 250 and a direct access memory-mapped interface 260. The block interface 250 may be a direct memory access (DMA) based read/write block interface. Normal file read/write accesses are handled through the block interface 250. Accesses to memory-mapped files are read or written directly to the storage device 280 through the memory-mapped interface 260.

A user application 202 or a filesystem 210 can read and write directly to/from the storage device 280 through normal system calls (e.g., read, write, fread, fwrite). Read/write data requests 204 are routed through the block core 230 (e.g., operating system) and are possibly fulfilled from the system block cache. The requests 206 that are not fulfilled are intercepted by storage driver 240, which sends block requests 208 to the block interface 250. The block requests 208 access the storage array 270 via the block interface 250.

When a user application attempts to memory-map a file on a device which is not direct-mappable, then the block core 230 submits block requests to fill up the page cache. Writes to non-memory-mapped files (e.g., non-XIP) are flushed to the storage device 280 by the kernel and/or the filesystem 210.

In one embodiment, memory-mapping a file on a memory-mappable partition (e.g., XIP capable), which has been mounted with memory mapping enabled, results in the filesystem using a direct access process with the storage driver 240. The storage driver 240 interacts with the storage device 280 to map a requested page into the memory-mapped interface 260. The driver 240 then returns an address in a memory space of the memory-mapped interface 260 to the filesystem 210. Subsequent requests for this page (e.g., read, write) result in a direct memory load/store from the storage device 280 across a bus. This direct access or memory-mapped access does not incur the software overhead associated with block requests accessing the block interface 250.

Figure 3:
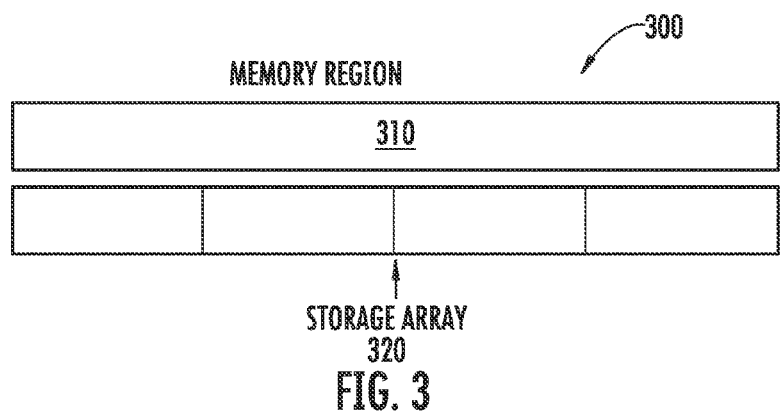
FIG. 3 illustrates a storage device that provides direct memory-mapped access and block access in accordance with another embodiment.

FIG. 3 illustrates a storage device that provides direct memory access in accordance with another embodiment. The storage device 300 implements a generic memory-mapped or direct-mapped interface to the storage array 320 (e.g., NOR array, PCM array). The following example assumes the storage device 300 is located on a PCI express bus. However, this interface is not limited to a PCI express bus and can be implemented on another bus or system interconnect.

In one embodiment, the memory-mapped interface (e.g., 260) includes a simple memory region 310 (e.g., PCI), which has a 1 to 1 correspondence to the storage array 320. For example, if the storage array has 1 GB of memory, then the memory region 310 has a 1 GB PCI base address register (BAR) memory region to allow direct access to the storage device 300. This interface allows a very simple pass-through of any mapped portions of the memory region. The filesystem (e.g., 210) will ask the driver (e.g., 240) for an address to associate each sector to in the requested file. The memory-mapped file can be directly accessed through this memory region 310.

Figure 4:
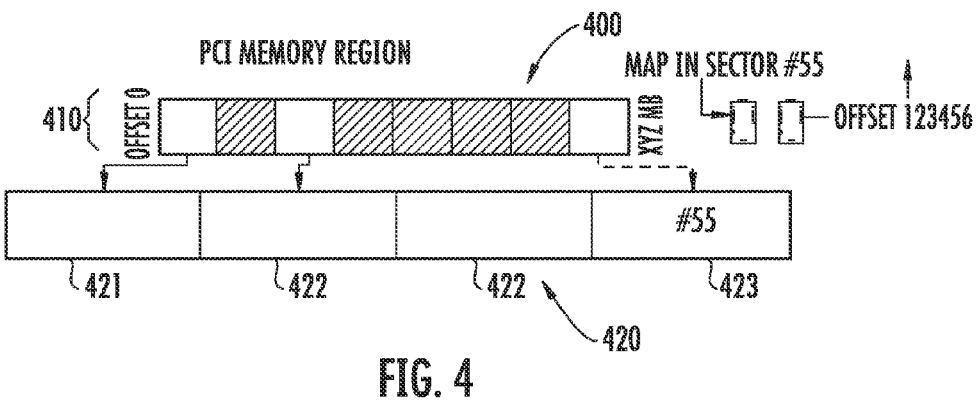
FIG. 4 illustrates another storage device that provides direct memory-mapped access and block access in accordance with another embodiment.

In another implementation of this interface as illustrated in FIG. 4, the memory-mapped interface is more complex but allows greater flexibility in defining which sectors are mapped and how those sectors can be addressed. In this version of the interface, the memory region 410 (e.g., PCI) is smaller than the storage array 420. In an embodiment, there is not a direct correspondence between PCI BAR and PCM storage offset. When a memory map is requested by the filesystem, the driver communicates with the storage device 400 through a register set to ask the storage device 400 to allow access to a particular sector (e.g., #55). The storage device 400 associates part of the PCI memory region 410 to a particular range in one of the PCM arrays 421-424. All further accesses in this range are directed to that PCM array.

The driver uses the information returned by the device 400 (e.g., offset 123456) to construct a kernel address, which the memory-mapped process uses to allow direct access to the array 420 for that particular sector. The filesystem repeats this process for each sector in a file until all necessary sectors are memory-mapped.

Accesses to unmapped ranges in the memory region 410 may have undefined results. The device may return all zeroes or it may return random noise. If no space is available in the memory region 410, the device will return a failure, which the driver sends to the filesystem layer and the memory map fails for that particular file.

Figure 5:
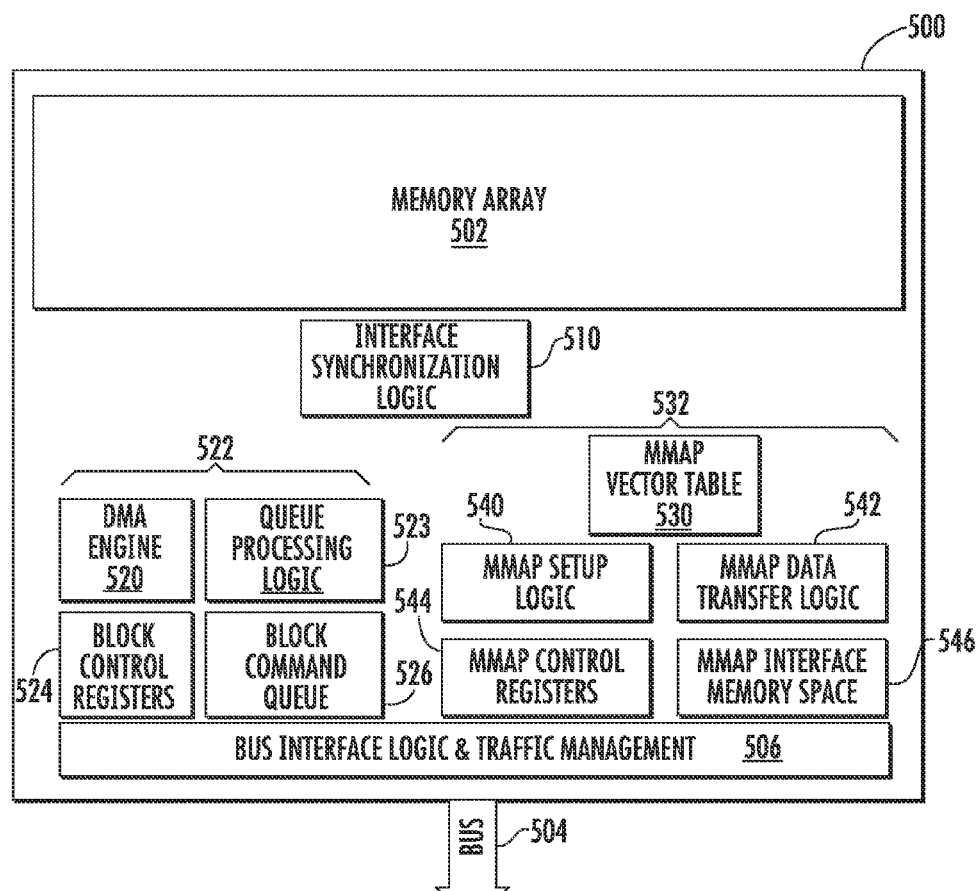
FIG. 5 illustrates another storage device that provides direct memory-mapped access and block access in accordance with another embodiment.

FIG. 5 illustrates another storage device that provides direct memory-mapped access and block access in accordance with another embodiment. The storage device 500 or storage apparatus stores data in the storage array 502. A memory-mapped interface 532 is coupled to the storage array 502. The memory-mapped interface 532 receives direct access requests from a host processor to directly access memory-mapped files. A block interface 522 is coupled to the storage array 502. The block interface 522 receives block requests from the storage driver to access the storage array. The block request accesses one or more sectors in a block interface command queue 526 that is located in the block interface 522. The block interface 522 also includes block control registers 524, a DMA engine 520, and queue processing logic 523.

The memory-mapped interface 532 includes a memory-mapped memory space 546, memory-mapped control registers 544, memory-mapped setup logic 540, memory-mapped data transfer logic 542, and a memory-mapped vector table 530. The memory-mapped setup logic 540 is configured to process a control signal received from the storage driver to make certain regions of the storage array 502 available in the memory-mapped memory space 546. The memory-mapped setup logic 540 is further configured to update a vector table 530 with mapping information. The memory-mapped data transfer logic 542 is configured to intercept direct access requests to the memory-mapped memory space and redirect the direct access requests to an appropriate location in the storage array indicated by the vector table 530. The memory-mapped memory space 546 receives read and write requests and reroutes these requests to the appropriate portion of the memory array 502 if it has been mapped by the setup logic 540. The control registers 544 are used by the storage driver to interact with the setup logic 540 and to map and unmap the storage array 502 (e.g., PCM array, NOR array). The vector table 530 contains traffic routing information for data requests and creates dynamic mapping between the memory space 546 and the storage array 502.

Bus interface logic 506 performs traffic management of requests and memory-mapped operations between the bus 504 and the block interface 522 and the memory-mapped interface 532. The interface synchronization logic 510 resolves conflicts between memory-mapped requests and the block requests.

Figure 6:
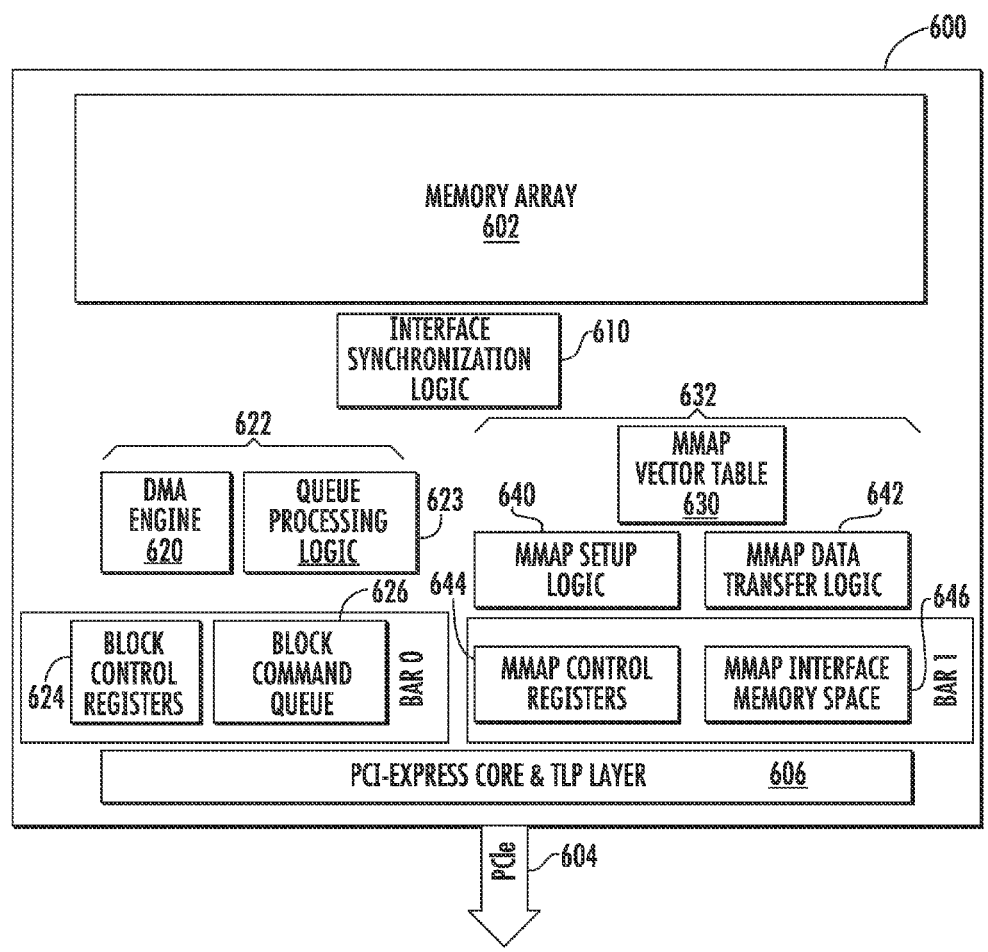
FIG. 6 illustrates another storage device that provides direct memory-mapped access and block access in accordance with another embodiment.

FIG. 6 illustrates another storage device that provides direct memory-mapped and block access in accordance with another embodiment. The storage device 600 or storage apparatus stores data in the storage array 502. The storage device 600 includes similar components and functionality as described above for the storage device 500. However, the storage device 600 is coupled to a PCI express bus. A memory-mapped interface 632 is coupled to the storage array 602. The memory-mapped interface 632 receives a request from a host processor to directly access memory-mapped files. A block interface 622 is coupled to the storage array 602. The block interface 622 receives block requests from the storage driver to access the storage array. The block request accesses one or more sectors in a block interface command queue 626 that is located in the block interface 622. The block interface 622 also includes block control registers 624, a DMA engine 620, and queue processing logic 623.

The memory-mapped interface 632 includes a memory-mapped memory space 646, memory-mapped control registers 644, memory-mapped setup logic 640, memory-mapped data transfer logic 642, and a memory-mapped vector table 630.

PCI express core and transaction layer packet (TLP) layer performs traffic management of requests and memory-mapped operations between the PCI express bus 604 and the block interface 622 and the memory-mapped interface 632. The interface synchronization logic 610 resolves conflicts between memory-mapped requests and block requests. The block interface (e.g., BAR 0) and the memory-mapped interface (e.g., BAR 1) can be represented as separate distinct PCI express BAR ranges.

Figure 7:
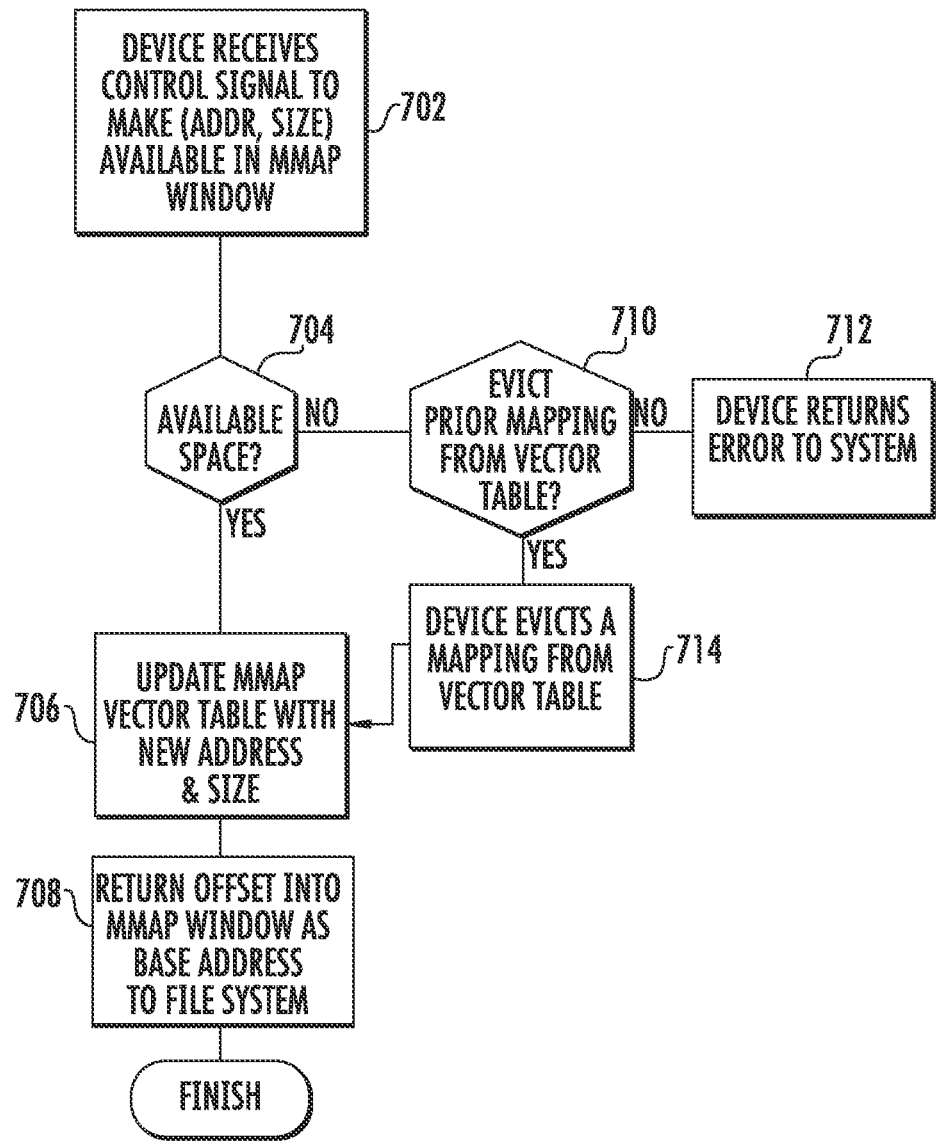
FIG. 7 illustrates a method for setting up memory-mapping for direct access to a storage device having a memory-mapped interface in accordance with one embodiment.

FIG. 7 illustrates a method for setting up memory-mapping for direct access to a storage device having a memory-mapped interface in accordance with one embodiment. Processing logic may perform operations for various methods described in the present disclosure. The processing logic may include hardware (circuitry, dedicated logic, etc.), software (such as is run on a general purpose computer system or a dedicated machine or a device), or a combination of both. The storage device receives a control signal to make address space (e.g., address, size) available in a memory-mapped region at block 702. Next, processing logic checks for available space in a memory-mapped vector table and associated memory-mapped region at block 704. Next, the processing logic updates the memory-mapped vector table with a new address and size at block 706 if there is available space at block 704. Next, the processing logic returns an offset into the memory-mapped region as a base address to the filesystem at block 708.

If there is not available space in the vector table and associated memory-mapped region, then the storage device determines whether to evict a prior mapping from the vector table at block 710. If no eviction occurs, then the storage device returns an error message or signal to the driver, which notifies the kernel at block 712. If an eviction occurs, then the device evicts a mapping from the vector table at block 414. Next, the method returns to the operation of block 706.

Figure 8:
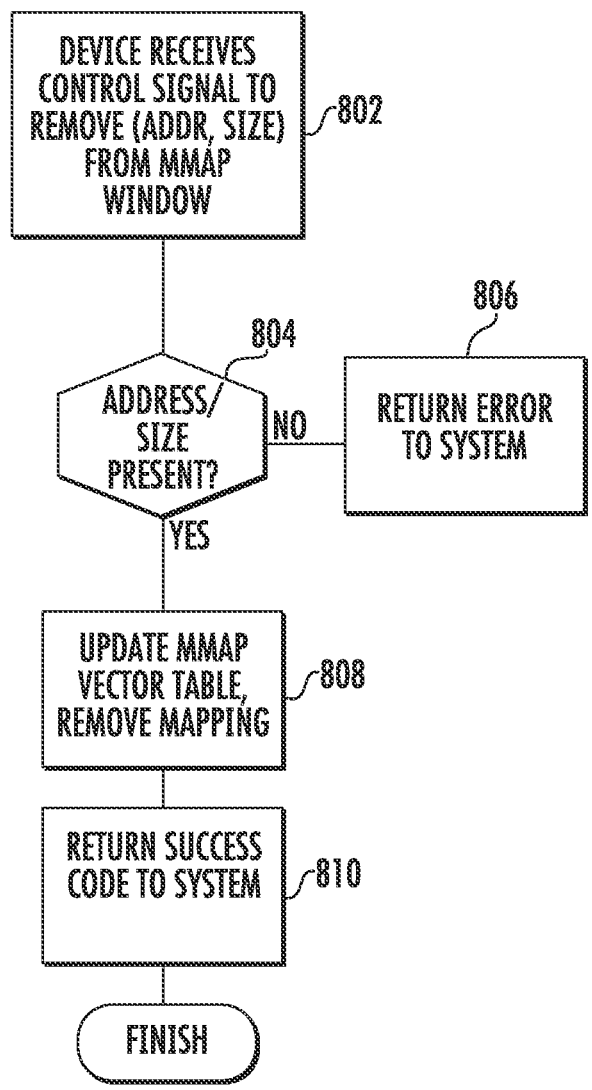
FIG. 8 illustrates a method for removing a memory-mapping for direct access to a storage device having a memory-mapped interface in accordance with one embodiment.

FIG. 8 illustrates a method for removing a memory-mapping for direct access to a storage device having a memory-mapped interface in accordance with one embodiment. The storage device receives a control signal to remove an address space (e.g., address, size) from a memory-mapped region at block 802. Next, processing logic checks if the address/size is present in a memory-mapped vector table at block 804. If not, then the storage device returns an error message or signal to the driver, which notifies the kernel at block 806. Otherwise, if the address/size is present in the vector table, then the processing logic updates the memory-mapped vector table by removing the current mapping with the present address/size at block 808. Next, the processing logic returns a success code to the driver, which notifies the kernel at block 810.

Figure 9A:
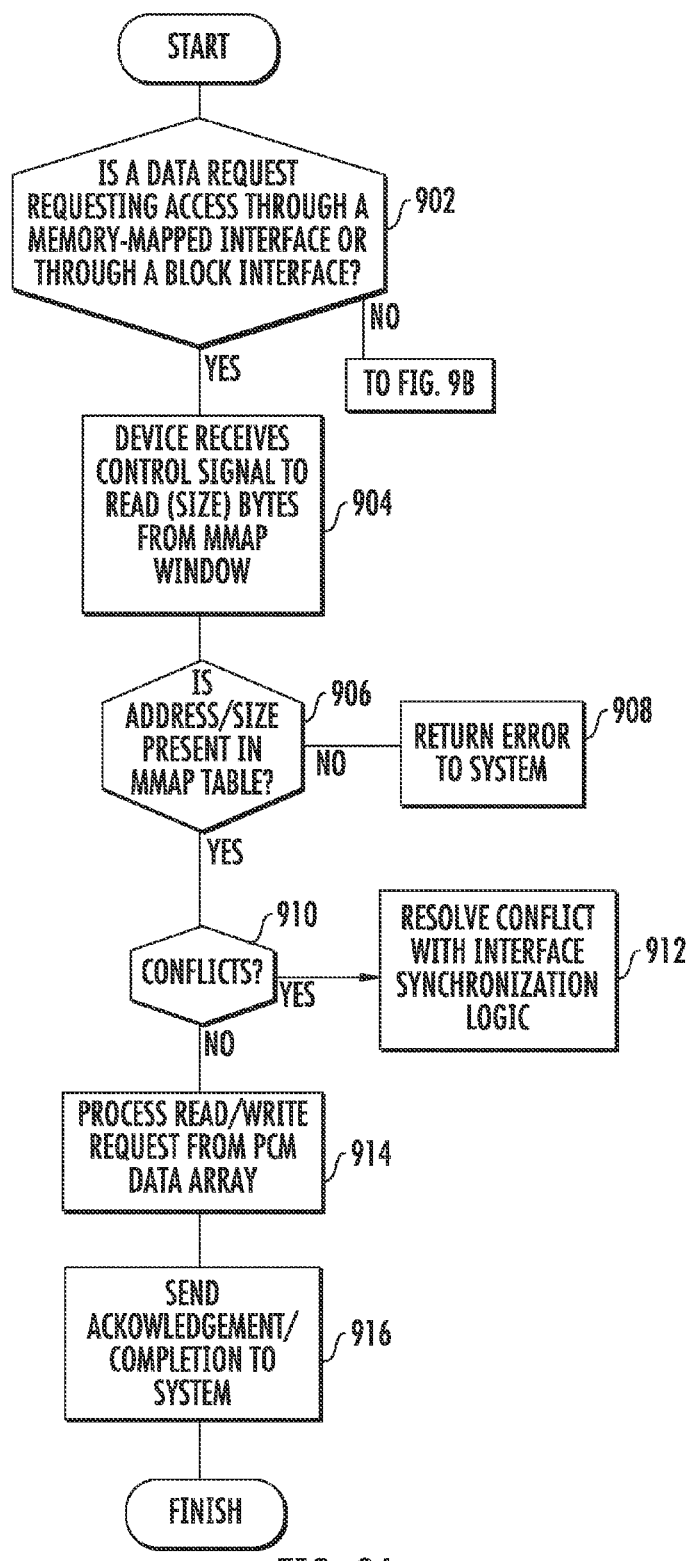
FIGS. 9A and 9B illustrate a method for accessing a block-based storage device having a memory-mapped interface and a block interface in accordance with one embodiment.
Figure 9B:
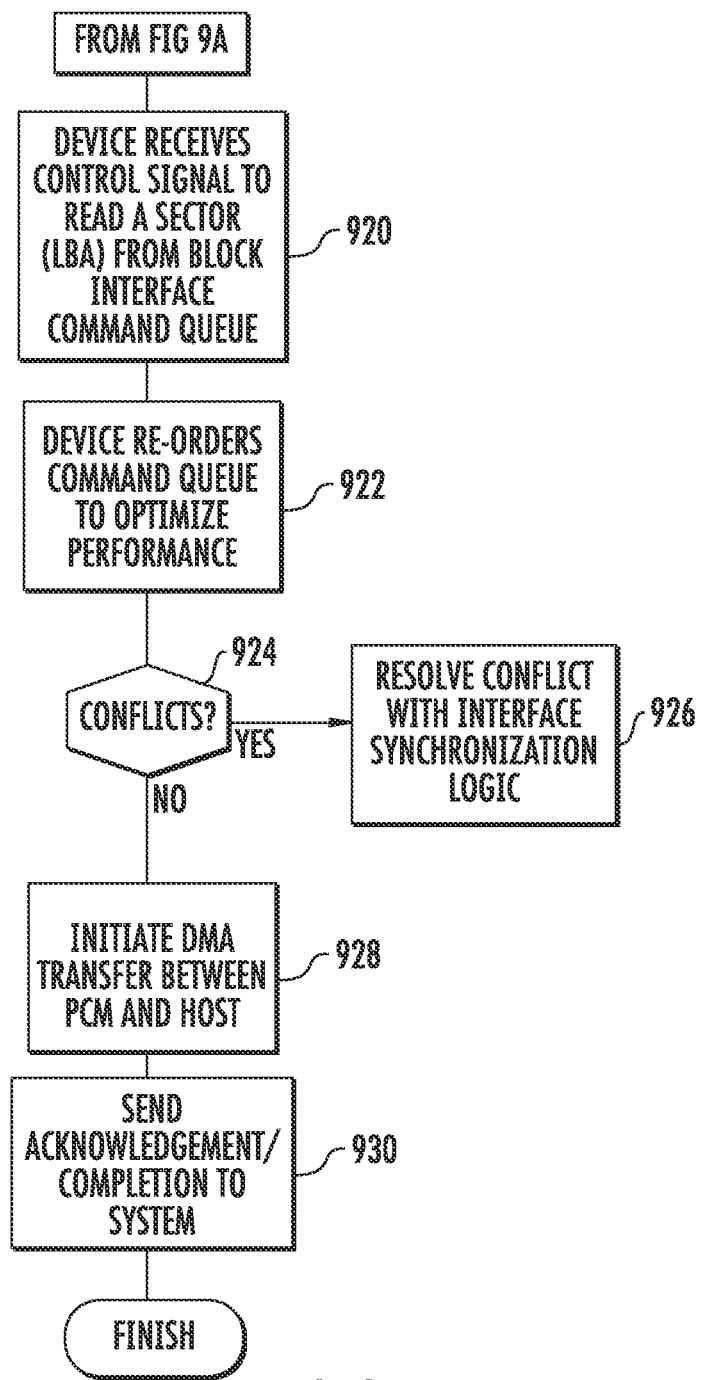

FIGS. 9A and 9B illustrate a method for accessing a block-based storage device having a memory-mapped interface and a block interface in accordance with one embodiment. Processing logic determines whether a data request is requesting access through the memory-mapped interface or through the block interface at block 902. For example, the request may want to read or write a particular file in the filesystem. In one embodiment, the storage device receives a control signal associated with the request (e.g., direct access request) to access the memory-mapped interface at block 904. The memory-mapped interface having a memory-mapped region and a vector table with mapping information is previously set up as described in conjunction with the description of FIG. 7. Next, the processing logic checks if address space having an address and size is available in the memory-mapped vector table at block 906. If no address space is available, then the processing logic returns an error message or signal to the driver, which notifies the kernel at block 908. If address space is available, then processing logic determines if the direct access request conflicts with any requests from the block interface at block 910. If any conflicts arise, then interface synchronization logic located in the storage device resolves the conflict at block 912 and the process returns to block 910 to determine if any conflicts remain. If no conflicts arise, then processing logic processes the request to access the block-based storage device via the memory-mapped interface at block 914. Then, the storage device sends an acknowledgement/completion message to the driver, which notifies the kernel at block 916.

Returning to the block 902, suppose the data request is handled through the block interface access as illustrated in FIG. 9B in accordance with an embodiment. The storage device receives a control signal associated with the request (e.g., block request) to access the block interface of the block-based storage device at block 920. The control signal requests access to a sector via a block interface command queue. Next, the storage device reorders the command queue to optimize performance at block 922. The processing logic determines if the block request conflicts with any requests from the memory-mapped interface at block 924. If any conflicts arise, then interface synchronization logic located in the storage device resolves the conflict at block 926 and the process returns to block 922 to determine if any conflicts remain. If no conflicts arise, then processing logic processes the request by initiating a DMA transfer between the storage device and a host at block 928 via the block interface. Then, the storage device sends an acknowledgement/completion message to the driver, which notifies the kernel at block 930.

Some portions of the detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings embodiments of the invention as described herein. In addition, it should be understood that operations, capabilities, and features described herein may be implemented with any combination of hardware (discrete or integrated circuits) and software.

In the above detailed description, numerous specific details are set forth in order to provide a thorough understanding of embodiments of the invention. However, it will be understood by those skilled in the art that the embodiments of the present invention may be practiced without these specific details. In other instances, well-known methods, procedures, components and circuits have not been described in detail so as not to obscure embodiments of the present invention. It is to be understood that the above description is intended to be illustrative, and not restrictive. Many other embodiments will be apparent to those of skill in the art upon reading and understanding the above description. The scope of embodiments of the invention should, therefore, be determined with reference to the appended claims, along with the full scope of equivalents to which such claims are entitled.

What is claimed is:

1. An apparatus, comprising:
a storage array to store data;
a memory-mapped interface having memory-mapped memory space coupled to the storage array, the memory-mapped interface to receive direct access requests to directly access memory-mapped files via the memory-mapped memory space;
a block interface coupled to the storage array, the block interface to receive block requests from a storage driver to access the storage array;
memory-mapped setup logic configured to make regions of the storage array available in the memory-mapped memory space if the regions of the storage array are available, the memory-mapped setup logic configured to determine whether to evict a prior mapping from a vector table if the regions of the storage array are not available, and the memory-mapped setup logic configured to provide an error message if no eviction occurs;
processing logic configured to check whether address space having an address and size is available in the vector table, if no address space is available the processing unit returns an error message, if the address space is available the processing logic determines whether the direct access requests conflict with any block requests for the block interface; and
synchronization logic configured to resolve any conflicts between the direct access requests and any block requests for the block interface determined by the processing logic.

2. The apparatus of claim 1, wherein the memory-mapped setup logic is configured to process a control signal received from the storage driver to make the regions of the storage array available in the memory-mapped memory space.

3. The apparatus of claim 2, memory-mapped setup logic is further configured to update the vector table with mapping information.

4. The apparatus of claim 3, further comprising:
memory-mapped data transfer logic is configured to intercept direct access requests to the memory-mapped memory space and redirect the direct access requests to an appropriate location in the storage array indicated by the vector table.

5. The apparatus of claim 4, wherein the storage driver to send a request to the block interface if the request is a block request.

6. The apparatus of claim 5, wherein a memory-mapped capable file system to directly access file allocation tables or other metadata that are stored in the storage array via the memory-mapped interface.

7. The apparatus of claim 1, wherein the block interface is configured to access unmapped files from the storage array without accessing the memory-mapped memory space.

8. The apparatus of claim 1, wherein the block interface is unauthorized to access the memory-mapped memory space.

9. A data processing device, comprising:
a processing unit having first and second processor cores;
system memory coupled to the processing unit, the system memory having an integrated circuit device comprising a storage array to store data;
a memory-mapped interface having memory-mapped memory space coupled to the storage array, the memory-mapped interface to receive direct access requests to access memory-mapped files via the memory-mapped memory space;
a block interface coupled to the storage array, the block interface to receive block requests to access the storage array;
memory-mapped setup logic configured to make regions of the storage array available in the memory-mapped memory space if the regions of the storage array are available, the memory-mapped setup logic configured to determine whether to evict a prior mapping from a vector table if the regions of the storage array are not available, and the memory-mapped setup logic configured to provide an error message if no eviction occurs;
processing logic configured to check whether address space having an address and size is available in the vector table, if no address space is available the processing unit returns an error message, if the address space is available the processing logic determines whether the direct access requests conflict with any block requests for the block interface; and
synchronization logic configured to resolve any conflicts between the direct access requests and any block requests for the block interface determined by the processing logic.

10. The data processing device of claim 9, wherein the memory-mapped setup logic is configured to process a control signal received from the storage driver to make the regions of the storage array available in the memory-mapped memory space.

11. The data processing device of claim 10, memory-mapped setup logic is further configured to update the vector table with mapping information.

12. The data processing device of claim 11, further comprising:
memory-mapped data transfer logic is configured to intercept direct access requests to the memory-mapped memory space and redirect the direct access requests to an appropriate location in the storage array indicated by the vector table.

13. The data processing device of claim 9, wherein the storage driver to send a request to the block interface if the request is a block request.

14. The data processing device of claim 13, wherein the block request to request access to one or more sectors in a block interface command queue located in the block interface.

15. A method, comprising:
determining whether a control signal indicates a request is directed to a memory-mapped interface or a block-based interface, the memory-mapped interface having memory-mapped memory space coupled to a block-based storage device,
making regions of the block-based storage device available in the memory-mapped memory space if the regions of the storage array are available;
determining whether to evict a prior mapping from a vector table;
providing an error message if no eviction occurs;
processing the request to access the block-based storage device via the memory-mapped interface if the request is requesting access to the memory-mapped interface;
checking whether address space having an address and size is available in the vector table;
returning an error message if no address space is available;
determining whether the request conflicts with any block requests for the block interface if the address space is available;

resolving any conflicts between the request and any block requests for the block interface using interface synchronization logic associated with the block-based storage device.

16. The method of claim 15, further comprising:
receiving a control signal that requests the address space in a memory-mapped window.

17. The method of claim 15, further comprising:
processing the request to access the block-based storage device via a block interface if the request is a block request.

18. A non-transitory computer-readable storage medium storing instructions which, when executed by at least one processor, cause the at least one processor to perform operations comprising:
determining whether a control signal indicates a request is directed to a memory-mapped interface or a block-based interface, the memory-mapped interface having memory-mapped memory space coupled to a block-based storage device,
making regions of the block-based storage device available in the memory-mapped memory space if the regions of the storage array are available;
determining whether to evict a prior mapping from a vector table;
providing an error message if no eviction occurs;
processing the request to access the block-based storage device via the memory-mapped interface if the request is requesting access to the memory-mapped interface;
checking whether address space having an address and size is available in the vector table;
returning an error message if no address space is available;
determining whether the request conflicts with any block requests for the block interface if the address space is available;
resolving any conflicts between the request and any block requests for the block interface using interface synchronization logic associated with the block-based storage device.

\* \* \* \* \*